United States Patent
Stone et al.

(10) Patent No.: US 7,062,782 B1
(45) Date of Patent: Jun. 13, 2006

(54) OVERLAY NETWORK FOR TRACKING DENIAL-OF-SERVICE FLOODS IN UNRELIABLE DATAGRAM DELIVERY NETWORKS

(75) Inventors: Robert J. Stone, Centerville, VA (US); Matthew J. Sibley, Columbia, MD (US)

(73) Assignee: UUNet Technologies, Inc., Ashburn, VA (US)

( * ) Notice: Subject to any disclaimer, the term of this patent is extended or adjusted under 35 U.S.C. 154(b) by 0 days.

(21) Appl. No.: 09/469,505

(22) Filed: Dec. 22, 1999
(Under 37 CFR 1.47)

(51) Int. Cl.
*G06F 11/00* (2006.01)
*G06F 11/22* (2006.01)
*G06F 12/14* (2006.01)

(52) U.S. Cl. .................. 726/22; 713/151; 713/153
(58) Field of Classification Search ............... 713/201, 713/151, 153; 709/224, 200; 370/216; 726/22
See application file for complete search history.

(56) References Cited

U.S. PATENT DOCUMENTS

| | | | | |
|---|---|---|---|---|
| 5,862,362 A * | 1/1999 | Somasegar et al. | ............ | 703/21 |
| 5,991,881 A * | 11/1999 | Conklin et al. | .............. | 713/201 |
| 5,996,021 A | 11/1999 | Civanlar et al. | ............. | 709/238 |
| 6,014,628 A * | 1/2000 | Kovarik, Jr. | .................... | 705/1 |
| 6,157,649 A * | 12/2000 | Peirce et al. | ................. | 370/401 |
| 6,182,226 B1 * | 1/2001 | Reid et al. | ................... | 713/201 |
| 6,185,689 B1 * | 2/2001 | Todd et al. | ................... | 713/201 |
| 6,282,546 B1 * | 8/2001 | Gleichauf et al. | ........... | 707/102 |
| 6,301,668 B1 * | 10/2001 | Gleichauf et al. | ........... | 713/201 |
| 6,321,338 B1 * | 11/2001 | Porras et al. | ................ | 713/201 |
| 6,327,242 B1 * | 12/2001 | Amicangioli et al. | ........ | 370/216 |
| 6,363,489 B1 * | 3/2002 | Comay et al. | ............... | 713/201 |
| 6,442,694 B1 * | 8/2002 | Bergman et al. | ............. | 713/201 |
| 6,484,203 B1 * | 11/2002 | Porras et al. | ................ | 709/224 |

(Continued)

OTHER PUBLICATIONS

Robert Stone. CenterTrack: An IP Overlay for Tracking DoS Floods. Oct. 1, 1999. p. 1-9.*
Using the Border Gateway Protocol for Interdomain Routing, http://www.cisco.com, accessed Nov. 5, 1999, 66 pages, Chapter 12.
Robert Stone, Center Track: An IP Overlay Network for Tracking DoS Floods, Oct. 1, 1999, 9 pages, UUNET Technologies, Inc.
Robert Stone, Center Track: An IP Overlay Network for Tracking Denial—of—Service Floods, Power Point Presentation, Oct. 5, 1999, 19 pages, UUNET Technologies, Inc.

*Primary Examiner*—Ayaz Sheikh
*Assistant Examiner*—Christian LaForgia

(57) ABSTRACT

An approach for tracking denial-of-service (DoS) flood attacks using an overlay IP (Internet Protocol) network is disclosed. One or more tracking routers form an overlay tracking network over the network of an Internet Service Provider (ISP). The ISP network includes numerous transit routers and edge routers. The tracking routers communicate directly with all the edge routers using IP tunnels. The edge routers within the ISP network perform security diagnostic functions, in part, to identify a DoS flood attack that has been launched by one or more attackers. To track down an attacker, an egress edge router identifies the DoS flood attack datagrams, rerouting these datagrams to the overlay tracking network. The tracking routers perform hop-by-hop input debugging to identify the ingress edge router associated with the source of the DoS flood attack.

29 Claims, 9 Drawing Sheets

U.S. PATENT DOCUMENTS

| | | |
|---|---|---|
| 6,499,107 B1 * | 12/2002 | Gleichauf et al. ........... 713/201 |
| 6,535,227 B1 * | 3/2003 | Fox et al. .................... 345/736 |
| 6,578,147 B1 * | 6/2003 | Shanklin et al. ............ 713/200 |
| 6,609,205 B1 * | 8/2003 | Bernhard et al. ............ 713/201 |
| 6,611,872 B1 * | 8/2003 | McCanne .................... 709/238 |
| 6,654,882 B1 * | 11/2003 | Froutan et al. .............. 713/153 |
| 6,687,732 B1 * | 2/2004 | Bector et al. ................ 709/200 |
| 6,687,833 B1 * | 2/2004 | Osborne et al. ............. 713/201 |
| 2002/0032871 A1 * | 3/2002 | Malan et al. ................. 713/201 |
| 2003/0135468 A1 * | 7/2003 | Barbir et al. .................. 705/64 |

* cited by examiner

OVERLAY NETWORK FOR TRACKING DENIAL-OF-SERVICE FLOODS IN UNRELIABLE DATAGRAM DELIVERY NETWORKS

BACKGROUND OF THE INVENTION

1. Field of the Invention

This invention relates to data communications, and more specifically relates to network security.

2. Discussion of the Background

The phenomenal growth of the Internet has presented Internet Service Providers (ISPs) with the continual challenge of responding to the millions of users' demand for reliable, fast and dependable access to this global resource. Satisfying these demands is imperative to maintaining a competitive edge in an intensely competitive market. To further intensify this challenge, ISPs and their customers frequently are victims of various types of packet flood attacks that negatively impacts service availability.

Packet flood attacks are a type of denial-of-service (DoS) attack. A DoS attack is initiated by an attacker to deliberately interfere or disrupt a subscriber's datagram delivery service. A packet flood attack differs from other types of denial-of-service attacks in that a flood attack requires constant and rapid transmission of packets to the victim in order to be effective. The flood attack overwhelms the victim's connection and consumes precious bandwidth on the ISPs' backbone networks. Examples of packet flood attacks specific to Unreliable Datagram Delivery Service Networks utilizing IP (Internet Protocol) include ICMP (Internet Control Message Protocol) flood, "SMURF" (or Directed Broadcast Amplified ICMP Flood), "Fraggle" (or Directed Broadcast UDP (User Datagram Protocol) Echo Flood), and TCP (Transmission Control Protocol) SYN flood. These attacks effectively prevent the subscribers from accessing the Internet; in some circumstances, the effects of these attacks may cause a victim host to freeze, thereby requiring a system reboot. In addition to being a nuisance, a system freeze can result in lost of data if precautions were not taken in advance. Because of the severe and direct impact it has on its subscribers, an ISP needs an effective mechanism to prevent or minimize these DoS attacks.

Like many other types of DoS attacks, the attacker can forge the source address of the flood packets without reducing the effectiveness of the attack. Finding the source of forged datagrams in a large, high-speed, unreliable datagram delivery service network is difficult when source-based forwarding decisions are not employed and sufficient capability in most high-speed, high-capacity router implementations is not available. Typically in this case, not enough of the routers in such a network are capable of performing the packet forwarding diagnostics that are required to determine the source. Because the source addresses of the attack packets are almost always forged, it is non-trivial to determine the true origin of such attacks. As a result, tracking down the source of a flood-type denial-of-service attack is usually difficult or impossible in networks that meet these criteria.

FIG. 9 shows a conventional high-speed network of an Internet Service Provider. An ISP network 901 includes a number of routers, of which edge routers 903, 905, 907, and 909 are shown. To access the Internet 913, user station 911 initiates a communications session with the ISP network 901. To transmit packets to the Internet 913, user station 911 generates the datagrams, which enter the ISP network 901 through edge router 905. These packets are then forwarded through one or more transit routers (not shown) within the ISP network 901, ultimately reaching edge router 907, which in turn forwards the packets to the Internet 913.

Assume now that user station 915 wants to prevent user station 911 from accessing the Internet 913, the attacking user station 915, for example, can launch a DoS flood attack such as a SMURF attack. In the role of attacker, user station (or host) 915 transmits a large amount of ICMP echo (PING) traffic using the directed broadcast addresses of previously discovered amplification subnets as the destination, in which the attacker 915 has a spoofed source address of the user station 911, which in this case is the victim. Accordingly, all of the hosts connected to the amplification subnets (which could be connected to the ISP network 901 or the Internet 913) will reply to the ICMP echo requests. A large public network such as the Internet serves an enormous number of hosts and it is trivial to find sufficient amplification subnets capable of overwhelming most victims. It is particularly trivial to overwhelm the connection of a typical subscriber, who has a 56 kbps modem. The only recourse that the subscriber on user station 911 has is to notify the ISP of the service disruption.

As seen in FIG. 9, an attacker 917 may reside within another network. User station 917 can initiate a flood attack through an external network 919, which is connected to ISP network 901 via edge router 903. External network 919 may belong to another ISP, which has a connection to the Internet 913 (not shown). Under this circumstance, ISP of network 901 after isolating the source of the attack to the external network 919 simply notifies the administrator of external network 919 that one of its subscribers is initiating a packet flood attack.

In recognition of this problem, ISPs have developed various solutions to eliminate or mitigate the damaging effects of DoS flood attacks. One approach is to equip every router within the ISP network 901, which includes transit routers (not shown) and edge routers 903, 905, 907 and 909, with an input debugging feature to trace the source of the flood attacks to a particular edge router that is associated with the DoS attack. To perform this tracing, personnel within the ISP manually performs hop-by-hop tracking to locate the edge router that serves as an ingress to the flood attack (which in this case is edge router 909). One drawback with this approach is the fact that every router, both transit and edge routers, is required to have the input debugging feature, which entails considerable expense. Further, many transit routers do not support this feature, as their main purpose is to forward packets at an extremely high rate; consequently, new hardware and software may need to be developed, thereby potentially delaying implementation of the appropriate security measures. Hardware and software development, in turn, may require adopting proprietary standards, and thus, may increase the complexity of the network because of interoperability issues, for example. Another drawback stems from the fact that the hop-by-hop tracking is performed manually, potentially locating the attacker after significant damage has already occurred. In other words, the flood attack may be over by the time the ISP is able to address the attack. Yet another drawback is that legitimate traffic could be impeded because input debugging is performed on the core network.

Based on the foregoing, there is a clear need for improved approaches for tracking DoS flood attacks.

There is also a need to limit the number and complexity of features that are required on routers.

There is also a need to minimize operational risks to the network.

There is also a need to expedite the deployment of security measures against DoS attacks by using existing hardware and software.

There is a further need to identify the source of the DoS floods without interrupting the flow of legitimate traffic.

Based on a need to deploy countermeasures against DoS attacks, an approach for tracking down the ingress edge router associated with the DoS attack using existing hardware and software infrastructure is highly desirable.

SUMMARY OF THE INVENTION

According to one aspect of the invention, a method is provided for tracking denial-of-service (DoS) floods. The method comprises rerouting a flood attack to a tracking router. The tracking router forms an overlay tracking network with respect to an egress edge router. The method also includes identifying an ingress edge router that forwarded the DoS flood attack datagram. Under this approach, the cost and deployment time for introducing a network security mechanism to counteract denial-of-service flood attacks is minimized.

According to another aspect of the invention, a communication system for tracking denial-of-service floods comprises a plurality of edge routers, which include an ingress edge router and an egress edge router. Each of the edge routers is configured to perform security diagnostic functions, in part, to identify a DoS flood attack datagram. The ingress edge router is associated with a source of the DoS flood attack datagram. A tracking router, which is adjacent to the egress edge router, performs security diagnostic functions. The ingress edge router reroutes the DoS flood attack datagram to the tracking router as to permit identification of the ingress edge router. The tracking router forms an overlay tracking network with respect to the plurality of edge routers. The above arrangement advantageously minimizes network complexity by utilizing standardized protocols and equipment.

In yet another aspect of the invention, a computer-readable medium carrying one or more sequences of one or more instructions for tracking denial-of-service floods. The one or more sequences of one or more instructions include instructions which, when executed by one or more processors, cause the one or more processors to perform the steps of receiving a datagram; identifying the DoS flood attack datagram; and identifying a previous hop router associated with the DoS flood attack datagram to ultimately locate an ingress router and an ingress adjacency associated with the DoS flood attack. This approach advantageously enables the identification of the ingress edge router associated with the DoS flood attack without interrupting the flow of legitimate traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a valuable solution for the tracking of DoS flood attacks using existing hardware and software infrastructure. An overlay network, which consists of IP (Internet Protocol) tunnels, is created to selectively reroute flood attack datagrams directly from edge routers to tracking routers. It is recognized that the tunnels may be created, in general, over any unreliable datagram delivery service protocol. The edge routers and the tracking routers are equipped with security diagnostic features to perform, according to one embodiment, input debugging. The tracking routers determine the ingress edge router by observing which tunnel the datagrams arrive on. These datagrams may then be examined and dropped or forwarded to the appropriate egress point. This approach simplifies the process of determining the ingress adjacency of a flood attack while bypassing any equipment, which may be incapable of performing the necessary diagnostic functions.

Although the present invention is discussed with respect to an Internet Protocol (IP) network, it should be appreciated that one of ordinary skill in the art would recognize that the present invention has applicability to other communication protocols.

Figure 1:
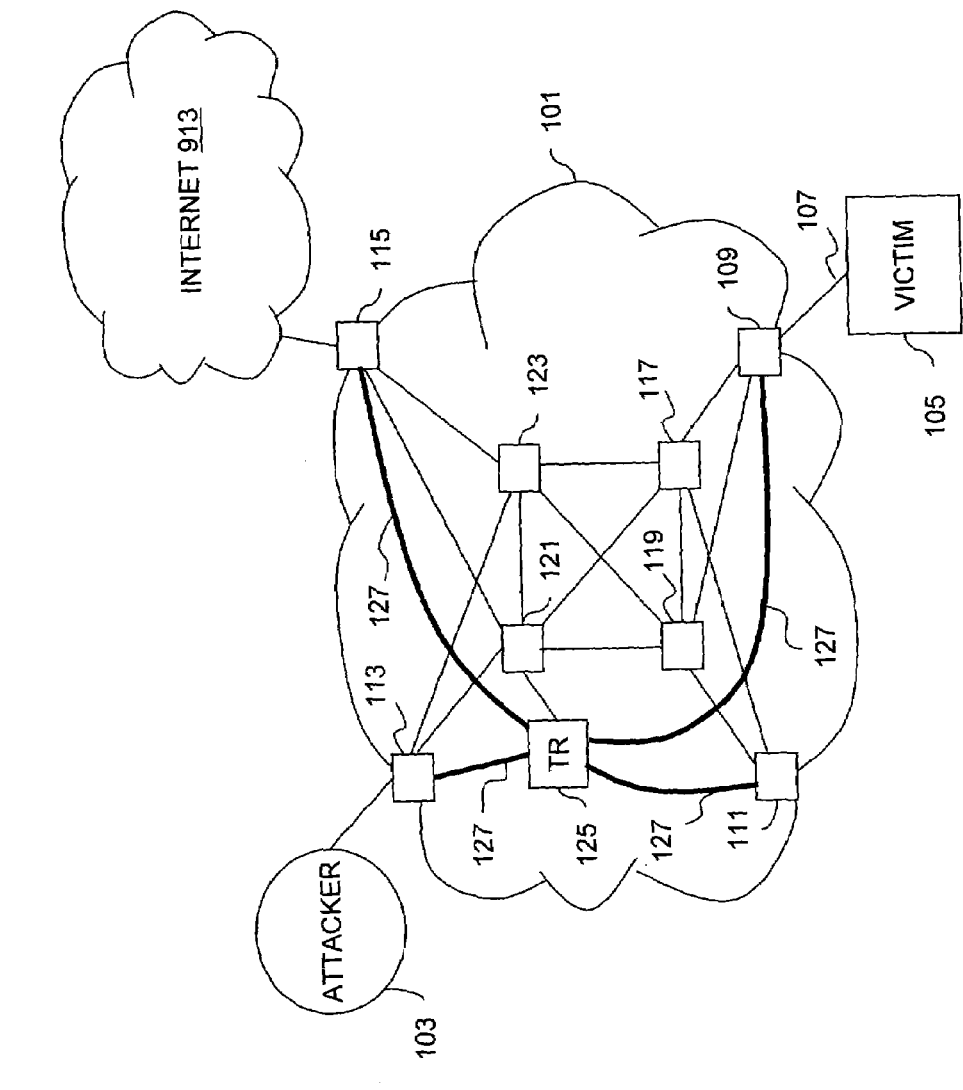
FIG. 1 is a diagram of an overlay tracking network in accordance with an embodiment of the present invention.

FIG. 1 shows a diagram of an overlay tracking network, according to an embodiment of the present invention. The network 101 of an Internet Service Provider (ISP) includes many different types of routers, depending on the roles these routers play in forwarding datagrams or packets within the network 101. The term "datagram" is used herein interchangeably with "packet" to signify a unit of information that contains delivery information (e.g., destination address) to permit forwarding through a packet switched network. As shown, ISP network 101 serves subscribers 103 and 105. Subscriber 103, in this example, assumes the role of an attacker, which introduces packet flood attacks that are destined for subscriber 105 to ISP network 101. As a recipient of the DoS flood attack datagrams, subscriber 105 assumes the role of victim. Both the attacker 103 and the victim 105 can be individual hosts, end systems, or other networks (such as another ISP). It should be noted that multiple attackers can transmit flood attacks to a single victim or multiple victims. For explanatory purposes, a single attacker 103 and a single victim 105 are shown. In this instance, attacker 103 desires to deny service to victim 105 by launching a series of packet flood attacks through a system of routers within network 101 to victim 105, thereby saturating the connection 107 of victim 105.

Within the system of FIG. 1, two basic classifications of routers exist: backbone routers, which are routers within the ISP network 101; and external routers, which are routers which are not a part of the ISP network 101. That is, external routers (not shown) belong to a subscriber or another ISP. Backbone routers 109–125 are further classified according to their adjacency. Edge routers 109, 111, 113, and 115 are backbone routers that are adjacent to one or more external routers. In addition, transit routers 117, 119, 121, and 123 are backbone routers that are adjacent only to other backbone routers. According to the present invention, another type of backbone router is defined as a tracking router 125. A tracking router 125 is logically adjacent to edge routers and other tracking routers (not shown).

At this point, the terminology with respect to adjacency is introduced to better understand the present invention. An adjacency between a tracking router 125 and an edge router 109, 111, 113 and 115, or a tracking router 125 and another tracking router (not shown), is called a tracking adjacency. In the example of FIG. 1, an ISP network 101 is assumed to receive attacks outside the network 101 in which the attacks are targeted at a victim 105 that is outside the network 101. Therefore, the malicious packets that comprise the flood attack are transmitted across the edge of the network at two points. The first point is termed ingress edge adjacency, i.e., the "source" of the attack; the second point is at an egress edge adjacency (the "destination" of the attack). Also, the term edge adjacency refers to an adjacency between an edge router and an external router. The ingress edge router is therefore the edge router that has the ingress edge adjacency, which in this example is edge router 113. The egress edge router is the edge router that has the egress edge adjacency; which, in this scenario, is edge router 109.

Subscriber 103, as attacker, launches DoS flood attacks using bogus source addresses so that victim 105 cannot detect the originator of the DoS flood attack datagrams simply by inspecting the received datagrams. The victim 105 experiences an inability to receive legitimate datagrams from, and possibly transmit through the connection 107. Further, as indicated previously, victim 105 may be required to reboot, assuming the victim 105 is a host computer. Victim 105 communicates its service disruption to the ISP, which must restore service by locating the attacker 103 and redirecting the bogus traffic away from the victim 105.

The ISP network 101 identifies an attack signature of the attack launched by 103. Attack signature refers to some pattern that can be used to help distinguish malicious packets from normal traffic. At the very least, an attack signature is defined by the IP address or address range of the victim 105, which is being attacked.

In the system of FIG. 1, tracking router 125 forms an overlay network with edge routers 109, 111, 113, and 115 to track down the ingress edge router that is responsible for forwarding the packet flood attacks into ISP network 101. According to one embodiment of the present invention, edge routers 109, 111, 113 and 115 as well as the tracking router 125 perform input debugging. Input debugging refers to the diagnostic features that determine the adjacency that originated a DoS flood attack datagram matching an attack signature on an individual router. Essentially, input debugging reveals the previous hop along the data path of the DoS flood attack datagrams. A tracking hop is defined as one usage of input debugging on a particular router. The number of tracking hops is expressed in terms of the maximum hop diameter of the backbone network 101 ($d$) and the hop diameter of the overlay tracking network ($d_t$). The use of input debugging in an overlay tracking network provides an ability for an ISP to expediently determine the ingress edge router.

The links 127 between tracking router 125 and the edge routers 109, 111, 113 and 115 are logical IP tunnels, according to an embodiment of the present invention. Alternatively, the links 127 may be actual physical connections or virtual connections (e.g., ATM (Asynchronous Transfer Mode) or frame relay); the virtual connections may be over any lower layer (n−1) protocol. IP tunnels 127 (shown as bold lines) are created over an existing IP network 101. Because IP is supported by all edge routers 109, 111, 113, and 115, the IP tunnels are isolated from any underlying infrastructure change of network 101. This advantageously reduces complexity of the overlay tracking network, as well as enhance speed of deployment.

Upon creation of the overlay tracking network, a method known as hop-by-hop tracking is employed to determine the ingress edge router that originated the DoS flood attack datagram. Hop-by-hop tracking involves recursively using the input debugging feature within edge routers 109, 111, 113, and 115 as well as tracking router 125 to identify the ingress edge adjacency. This approach is further detailed in FIG. 2, below.

Figure 2:
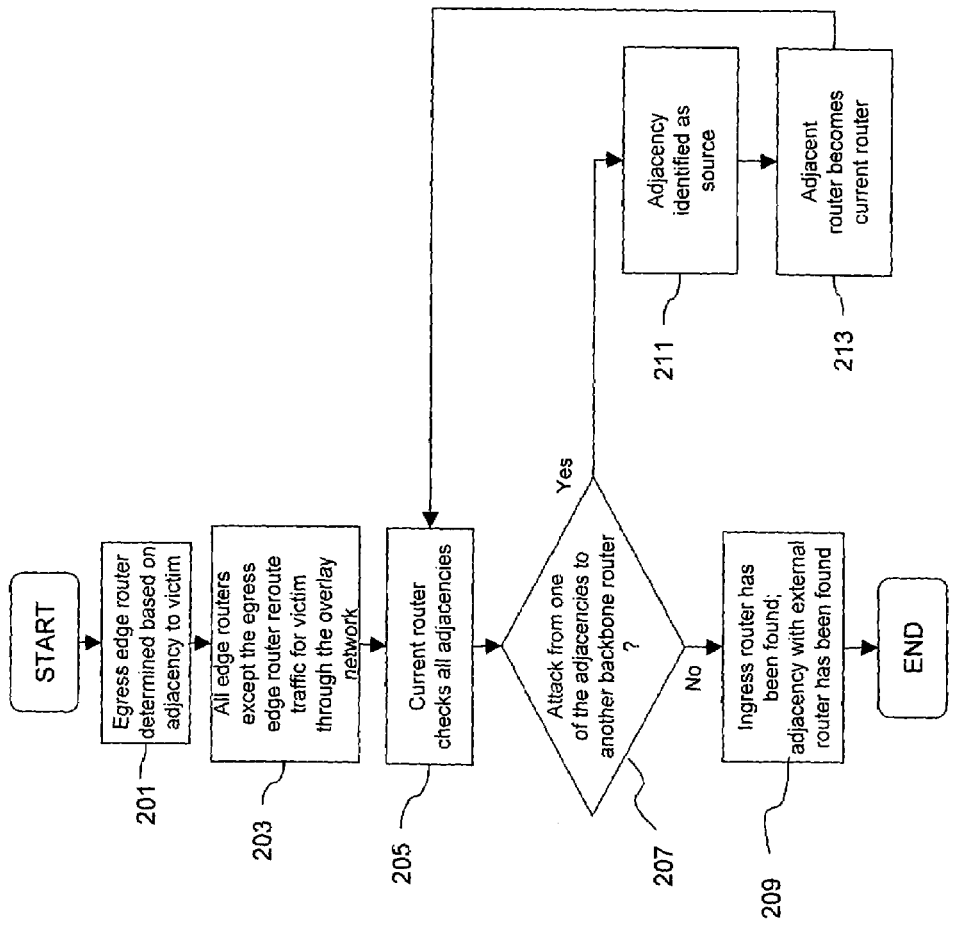
FIG. 2 is a flow diagram of the hop-by-hop input debugging operation as performed by the system of FIG. 1.

FIG. 2 shows a flow diagram of the hop-by-hop input debugging operation employed by the overlay tracking network of FIG. 1. Because each edge router 109, 111, 113, and 115 is equipped with security diagnostic functions, these routers 109, 111, 113, and 115 can identify DoS flood attack datagrams based upon the attack signature. Turning back to the example in FIG. 1, egress edge router 109 is determined based on detection of a DoS attack (which may be performed by the victim or tools employed by the network provider) egressing through that router, per step 201. All edge routers, with the exception of the egress edge router, reroute all packets destined for the victim through the overlay network to the egress edge router due to a dynamic routing update. The egress edge router specifically does not receive this update, ignores the update, or otherwise does not honor the update. The result of this is that all packets received by edge routers 111, 113, 115 destined for the victim 105 are routed through the tracking router 125 to the egress edge router 109.

Thereafter, hop-by-hop tracking is then used, starting with the tracking router closest to the victim 105, which will always be logically adjacent to the egress edge router 109. In the system of FIG. 1, because there is only one tracking router, two iterations of hop-by-hop tracking are performed. In step 205, the current tracking router, which is tracking router 125 in this example, checks all the tunnels 127. Next, tracking router 125 determines whether a DoS flood attack datagram exists on any of the 127, as in step 207. If no attack is Identified from any of the tunnels 127, then the attack is originated from the egress edge router 109. In this rare case, the ingress edge router is the same as the egress edge router. Input debugging is then performed, as in step 209, on the edge router 109 to find the source of the DoS flood attack datagrams; this would be another external adjacency (not shown). However, if step 207 determines that the DoS flood attack datagram is originating from one of the tunnels, the corresponding adjacency is identified as the source, per step 211. In step 213, the adjacent edge router associated with the identified adjacency becomes the current router for the purposes of the hop-by-hop tracking scheme. Accordingly, step 205 and subsequent steps are repeated as many times as necessary until the ingress edge router 113 is located.

The above method of FIG. 2 provides an example involving one attacker 103; however, one of ordinary skill in the art would recognize that an attack from multiple sources can be tracked using the above method. Where multiple source adjacencies are identified, each adjacency is investigated separately (possibly in parallel) until multiple edge adjacencies are identified. Such a capability is useful since multiple source attacks are common. That is, attackers often collaborate to disrupt the service of a single victim especially when each individual attacker lacks the resources to launch an effective attack.

Figure 3:
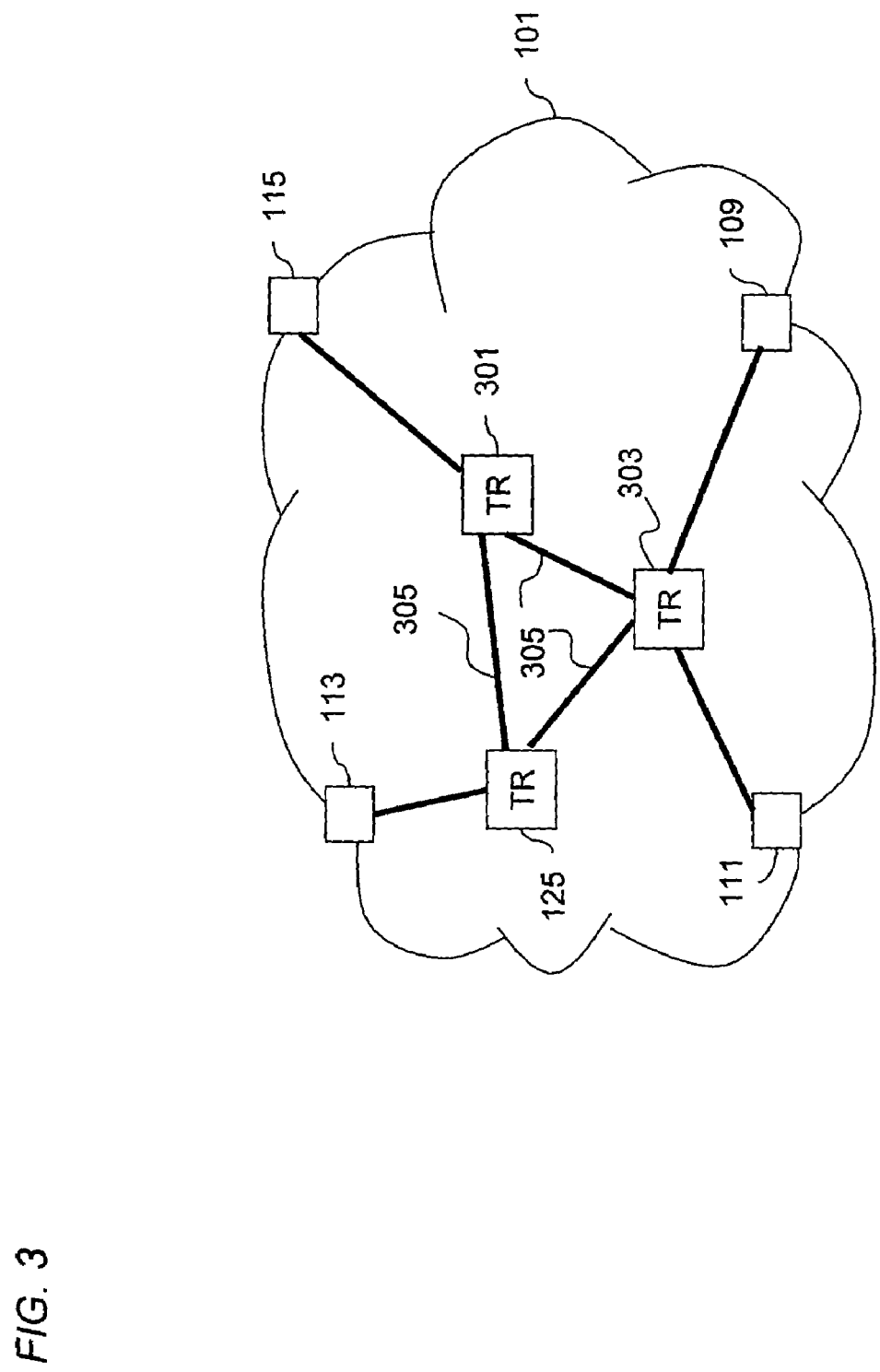
FIG. 3 is a diagram of the tracking routers in a fully meshed configuration, according to one embodiment of the present invention.

The embodiment of FIG. 1 involves a single tracking router 125 participating in the overlay tracking network. The overlay network can scale if the number of edge routers is larger than the number of tracking adjacencies than a single router can service. In other words, if a single tracking router cannot support sufficient number of tracking adjacencies (e.g. IP tunnels, Border Gateway Protocol (BGP) sessions, and other resources necessary to maintain a particular number of adjacencies), then multiple routers are necessary. Although BGP is discussed herein, one of ordinary skill in the art would recognize that any inter-administrative-domain routing/signaling protocol may be used. FIG. 3 shows a diagram of an overlay tracking network with three tracking routers in a fully meshed configuration. In FIG. 3, transit routers 117, 119, 121, and 123 (of FIG. 1) are not shown to simplify the diagram. The overlay tracking network includes two additional tracking routers 301 and 303, which possess the same functionalities as tracking router 125. The single level full mesh configuration of tracking routers 125, 301 and 303 are interconnected via IP tunnels (shown as bold lines) 305 as are the links to the edge routers 109, 111, 113, and 115.

For a single level network of tracking routers, assuming each tracking router can handle C tracking adjacencies, then the number of tracking routers (NC) is as follows:

$$N_C = [(C+1) - ((C+1)^2 - 4N_E)^{1/2}]/2 \quad \text{Eq. (1)}$$

$N_E$ is the number of edge routers present in the network 101. Thus, the number of tracking routers increases at the rate of $O(N_E^{1/2})$ until a useful maximum of $[(C-1)/2]$ is reached.

Figure 4:
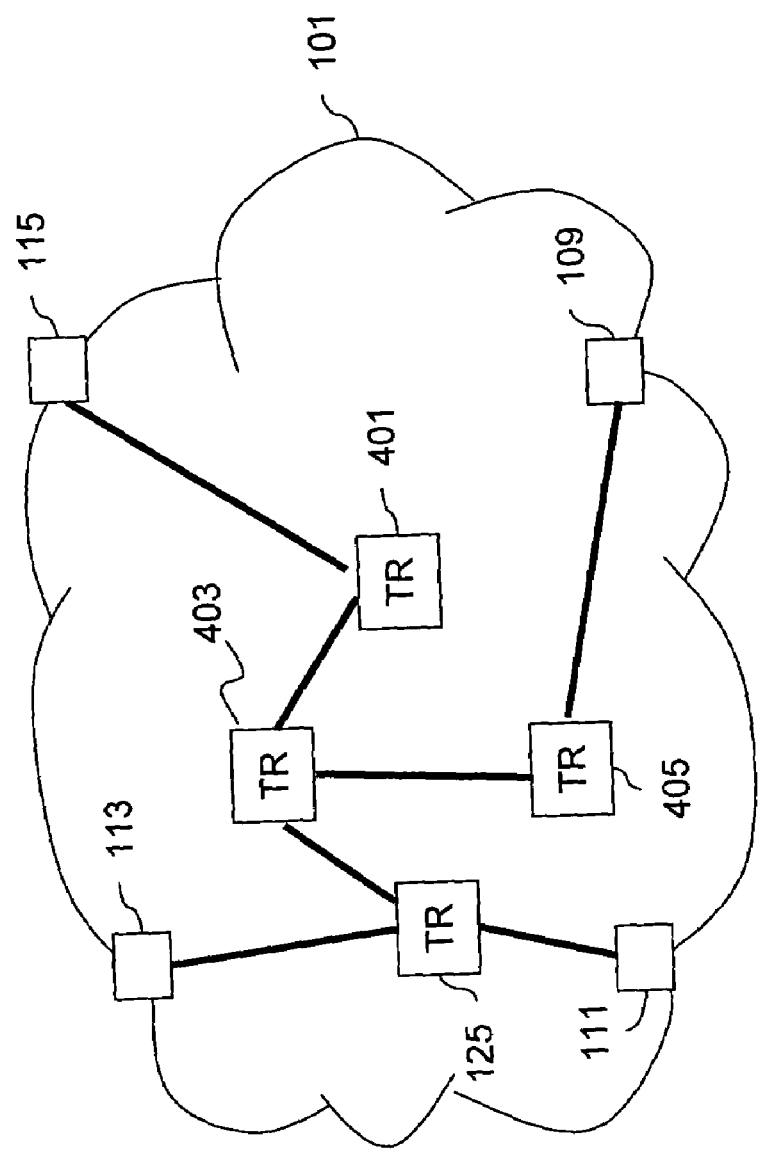
FIG. 4 is a diagram of the tracking routers in a two-level hierarchical arrangement, according to one embodiment of the present invention.

In the alternative to the full mesh overlay network of FIG. 3, FIG. 4 shows an overlay tracking network with tracking routers arranged in a two-level hierarchy. Another tracking router 403 is introduced at a second level in the hierarchy. The overlay tracking network includes tracking router 125 in communication with tracking router 403, which is at the higher hierarchical level. Tracking routers 401 and 405 are also connected to tracking router 403. Tracking routers 125, 401 and 405 are at the same hierarchical level and directly attach to edge routers 109, 111, 113 and 115, as shown in FIG. 4. Under this topology, approximately NC adjacencies between tracking routers and other tracking routers are substituted with $N_C-1$ adjacencies to a single second level tracking router 403. This increases the diameter of the overlay tracking network by an additional hop, and frees up approximately $N_C^2 - N_C$ adjacencies. This topology is desirable when the network 101 grows at a pace faster than the tracking routers' adjacency capacity and NC is reaching its limit. The tracking adjacencies capacity of each tracking router, C, can be calculated according to equation (2):

$$C = [N_C - 1 + N_E/N_C] \quad \text{Eq. (2)}$$

Figure 5:
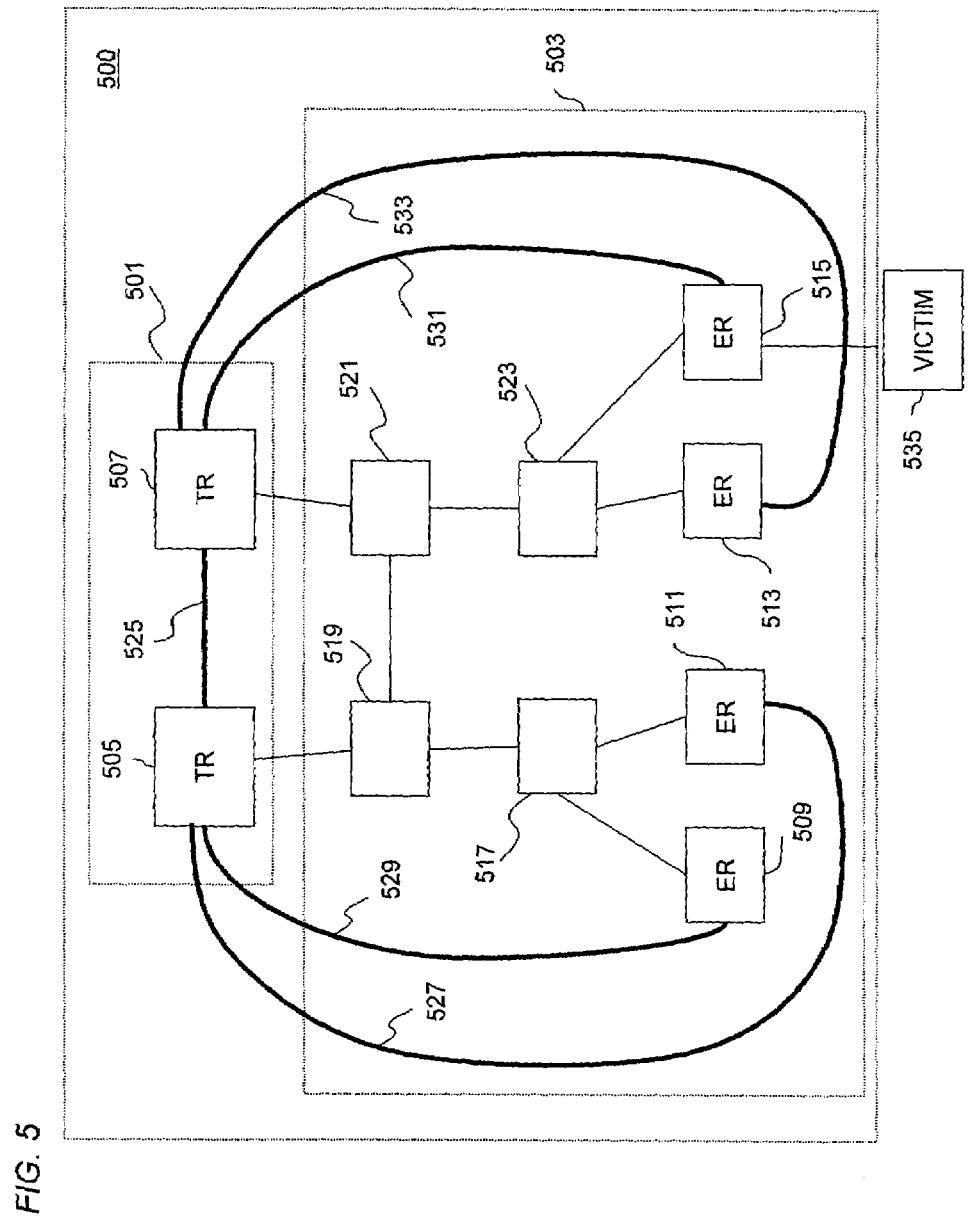
FIG. 5 is a diagram of an overlay tracking network utilizing two tracking routers, in accordance with one embodiment of the present invention.

FIG. 5 shows an overlay tracking network with two tracking routers, according to an embodiment of the present invention. An ISP network 500 includes two autonomous systems (AS) 501 and 503, which essentially separate the tracking routers 505 and 507 from the rest of the backbone routers 509–523 in terms of dynamic routing policy. An autonomous system is a grouping of routers that operate under the same administrative domain. Basically, each domain has knowledge of the addresses that are assigned to the other domain, and of the manner in which the other domain accepts packets. Each administrative domain can enforce an elaborate access and attribute modification policy over routing requests that it receives from the other domain. However, each domain is not aware of how the packets are internally routed in the other domain.

As shown in FIG. 5, AS 501 includes tracking routers 505 and 507, while AS 503 includes edge routers 509, 511, 513, and 515 as well as transit routers 517, 519, 521 and 523, which follow a two-level hierarchy. Transit routers 519 and 521 represent the top level in the transit router hierarchy, and transit routers 517 and 523 are at the bottom level of the hierarchy. The tracking routers 505 and 507 are connected to the top level transit routers 519 and 521, respectively. An IP tunnel 525 exists between the two tracking routers 505 and 507. Tracking router 505 communicates over IP tunnel 527 with edge router 511 and communicates with edge router 509 via IP tunnel 529. The remaining edge routers 513 and 515 are linked to tracking router 507 via IP tunnels 533 and 531, respectively. In this manner, all edge routers 509, 511, 513 and 515 are reachable from each other through the overlay tracking network, which is created, in part, by tracking routers 505 and 507. A victim 535 is linked to edge router 515.

Once tunnels 525, 527, 529, 531, and 533 are built, an Interior Gateway Protocol (IGP), such as IS—IS (Intermediate System-to-Intermediate System), distributes link-state information about the tunnels 525, 527, 529, 531, and 533. The IS—IS intradomain routing exchange protocol is an ISO (International Organization for Standardization) standard 10589. Because tracking routers 505 and 507 are on a different autonomous system than edge routers 509, 511, 513 and 515, tracking routers 505 and 507 utilize BGP to announce routes to the edge routers 509, 511, 513 and 515. BGP provides loop-free intradomain routing between AS 501 and AS 503. BGP is defined in IETF (Internet Engineering Task Force) RFC 1771, which is incorporated by reference herein in its entirety. Within the same AS, the routers run internal BGP (IBGP), while routers of different autonomous systems run external BGP (EBGP). One of ordinary skill in the art would recognize that a number of other routing/signaling protocols (e.g., ISIS) may be utilized, other than EBGP. IBGP routers (i.e., routers within the same AS) use loop back interfaces to eliminate a dependency that arises when an IP address of a physical interface is used to configure BGP. That is, the loop back interface is used so that BGP does not have to rely on the availability of a particular interface for establishing TCP (Transmission Control Protocol) connections. BGP specifies TCP as the transport layer protocol for the transmission of routing information between peer routers. Such routing information includes AS numbers reflecting a path to the destination network. Based upon this routing information, BGP constructs a loop free map of the autonomous systems 501 and 503.

In this example, a static route with a destination of the egress edge router 515 is added on the tracking router that is closest to the victim 535, which in this case is tracking router 507. The static route is then redistributed into the overlay tracking networks BGP, which is advertised to all tracking routers as well as to all edge routers 509, 511, 513 and 515. To prevent the routing loop, a static route with a destination of the appropriate next-hop external router for the victim 535 is added on the egress edge router 515. The static route on the egress edge router 515 takes precedence over the route from the overlay tracking network, causing the edge router 515 to continue routing traffic to the victim 535. With the static routes in place, a new path is created through the overlay tracking network hop-by-hop input debugging is then applied beginning with the tracking router that is closest to the victim 535 to find the attacker.

Figure 6:
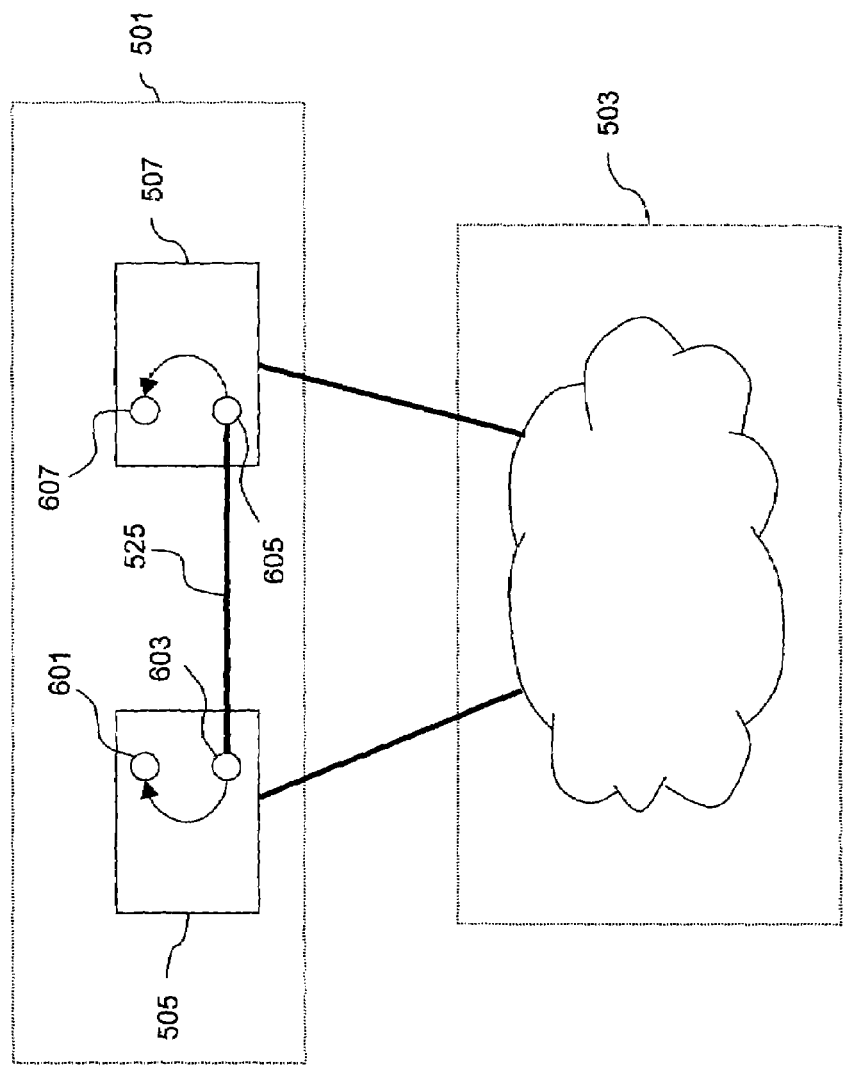
FIG. 6 is a diagram of the tracking routers communicating using IP (Internet Protocol) tunneling according to the system of FIG. 5.

FIG. 6 illustrates the interconnection between two tracking routers using IP tunneling in accordance with an embodiment of the present invention. It is noted that if a tracking router learns that a tunnel's termination address is reachable through the tunnel 525 itself, then the tunnel 525 collapses and becomes useless. To prevent collapse of tunnel 525, it is necessary to ensure that no tunnel termination address can be announced through the tunnel 525. Thus, according to an exemplary embodiment, one approach is to number tunnel termination interfaces out of a distinct range of addresses, called the tunnel termination address space, using this range to filter the routing announcements. In addition, traffic that should be on the overlay tracking network are to be routed directly out of a tracking router's physical interface.

For this reason, tunnel interfaces are numbered out of a distinct address range (i.e., tunnel interface address space) in which the least specific prefix for this address block are routed to a "black hole" interface to prevent matching a default route. Once the address ranges are defined, tunnel interfaces never announce or accept prefixes from the tunnel termination address space. Further, the physical interfaces of the tracking routers 505 and 507 never announce or accept prefixes that are part of the tunnel interface address space. Accordingly, tunnels are prevented from collapsing by configuring the route announcement filtering in the manner described above.

As shown in FIG. 6, tracking router 505 has an overlay loop back interface 601 and a primary loop back interface 603. Similarly, tracking router 507 has an overlay loop back interface 607 and a primary loop back interface 605. In both cases, the overlay loop back interfaces are used instead of the tunnel interface addresses. The overlay loop back address provides the next-hop identity on the overlay tracking network. The primary loop back addresses provide the next-hop identity on the backbone network within AS 503. Tunnel 525 is established using the primary loop backs 603 and 605 as termination points. Reachability for the overlay loop backs is established over the tunnel 525, which is not numbered. This reachability for the overlay loop backs is established by running IS—IS.

Once the tracking routers 505 and 507 of AS 501 become aware of each others overlay loop backs these routers 505 and 507 establish IBGP sessions with each other over tunnel 525 using the overlay loop backs. It should be noted that IS—IS does not announce any information about the primary loop backs 603 and 605, thereby preventing collapse of tunnel 525. Further, IBGP is prevented from announcing these primary loop backs 603 and 605 by filtering the address block that all primary loop backs 603 and 605 are numbered out of. In addition, IS—IS is configured to simply not know about the primary loop backs 603 and 605.

Figure 7:
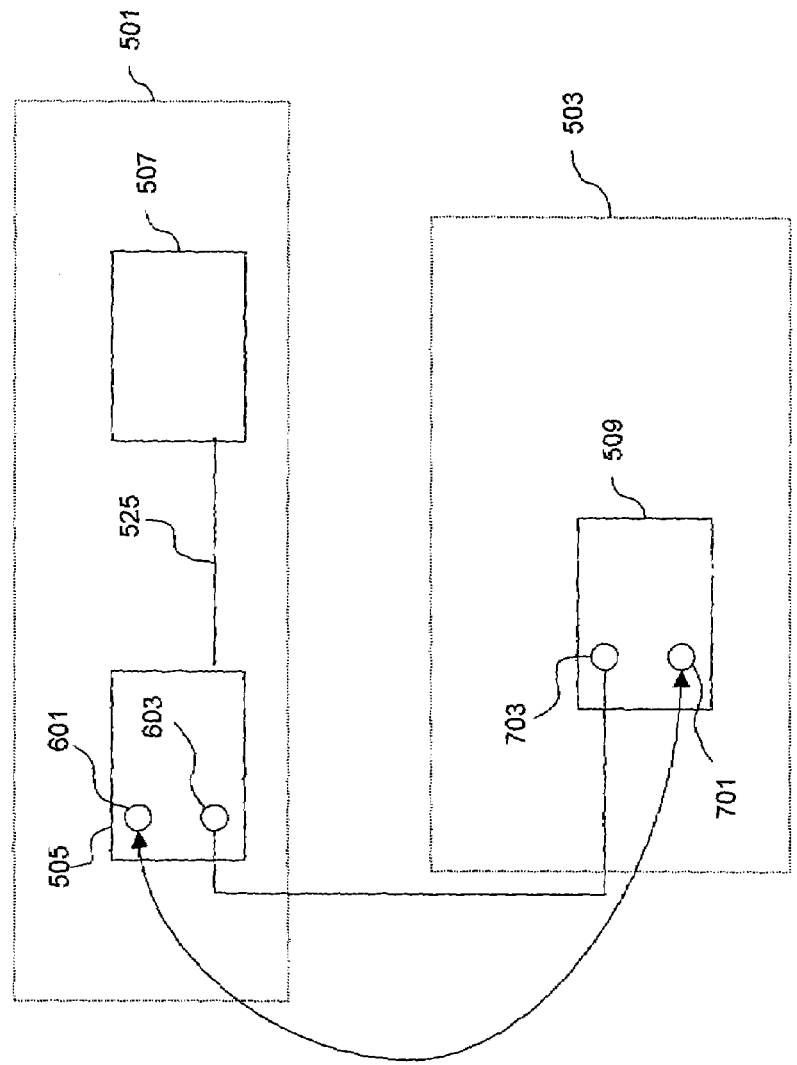
FIG. 7 is a diagram of the IP tunnel between a tracking router and an edge router according to the system of FIG. 5.

FIG. 7 shows a tunnel connection between a tracking router and an edge router, according to an embodiment of the present invention. After the tracking routers 505 and 507 are fully connected with tunnels, each edge router (of which only edge router 509 is shown) is linked to a tracking router using IP tunnels. Similar to the interconnection between tracking routers 505 and 507, primary loop backs are used as termination points for the tunnels. Edge router 509 has an overlay loop back 701 as well as a primary loop back 703. For the edge routers, reachability for the overlay loop backs is established using static routes. Once the overlay loop backs are known, EBGP sessions are established between edge router 509 and tracking router 505 via overlay loop backs 601 and 701. A static route also exists between tracking router 505 and edge router 509 via primary loop backs 603 and 703. The overlay tracking network does not accept any routes that are announced from an edge router; however, edge routers accept any routes from the overlay tracking network, setting the local preference high to force the route through the overlay tracking network.

It should be noted that other methods of configuring BGP or other routing/signaling protocol attributes to achieve the desired results are possible. Also, it is possible to implement IP-over-IP tunnels without the use of an overlay loopback interface if each tunnel interface is explicitly numbered.

Figure 8:
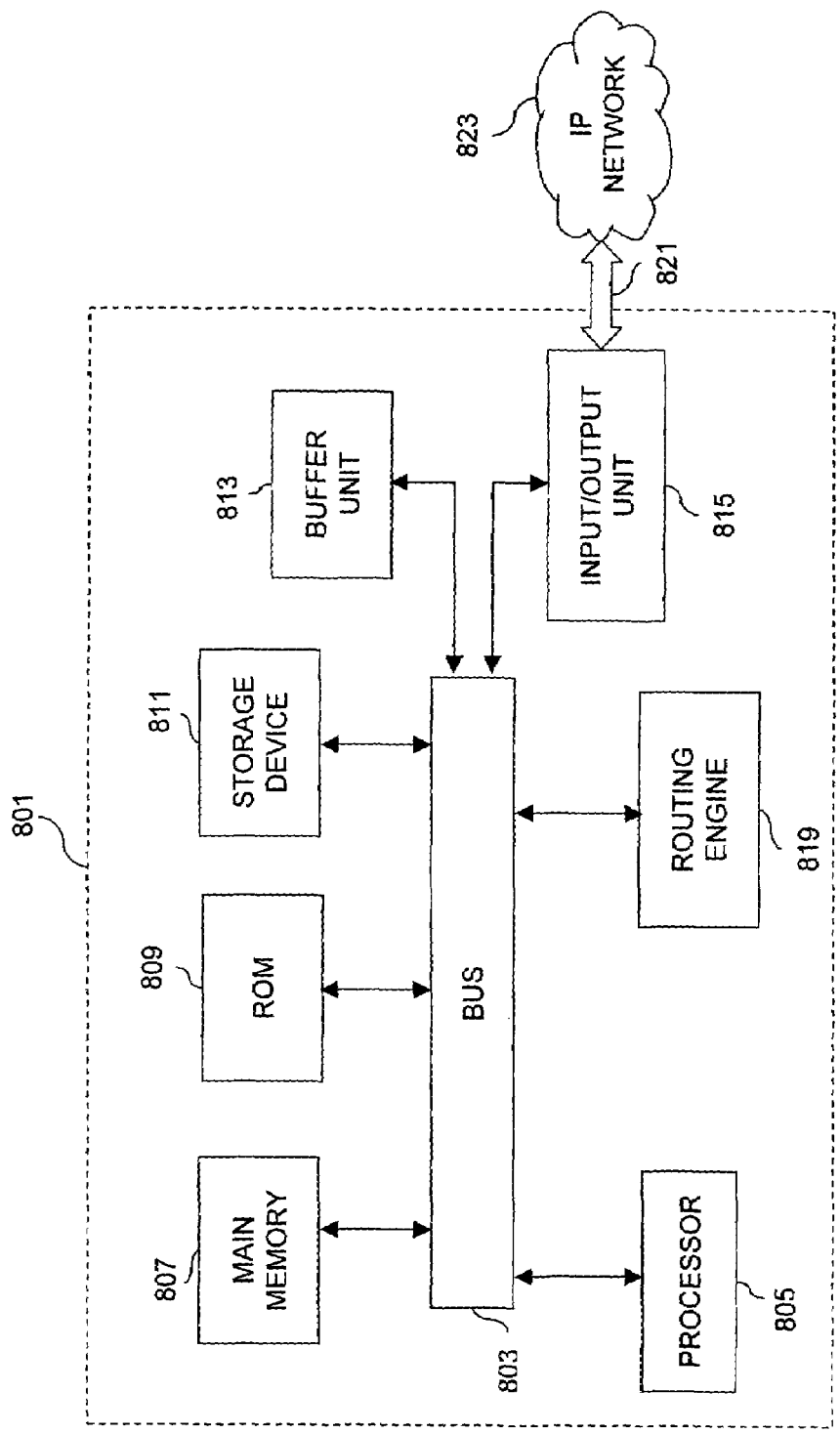
FIG. 8 is a block diagram of an exemplary architecture of a general router utilized in the system of FIG. 5.
Figure 9:
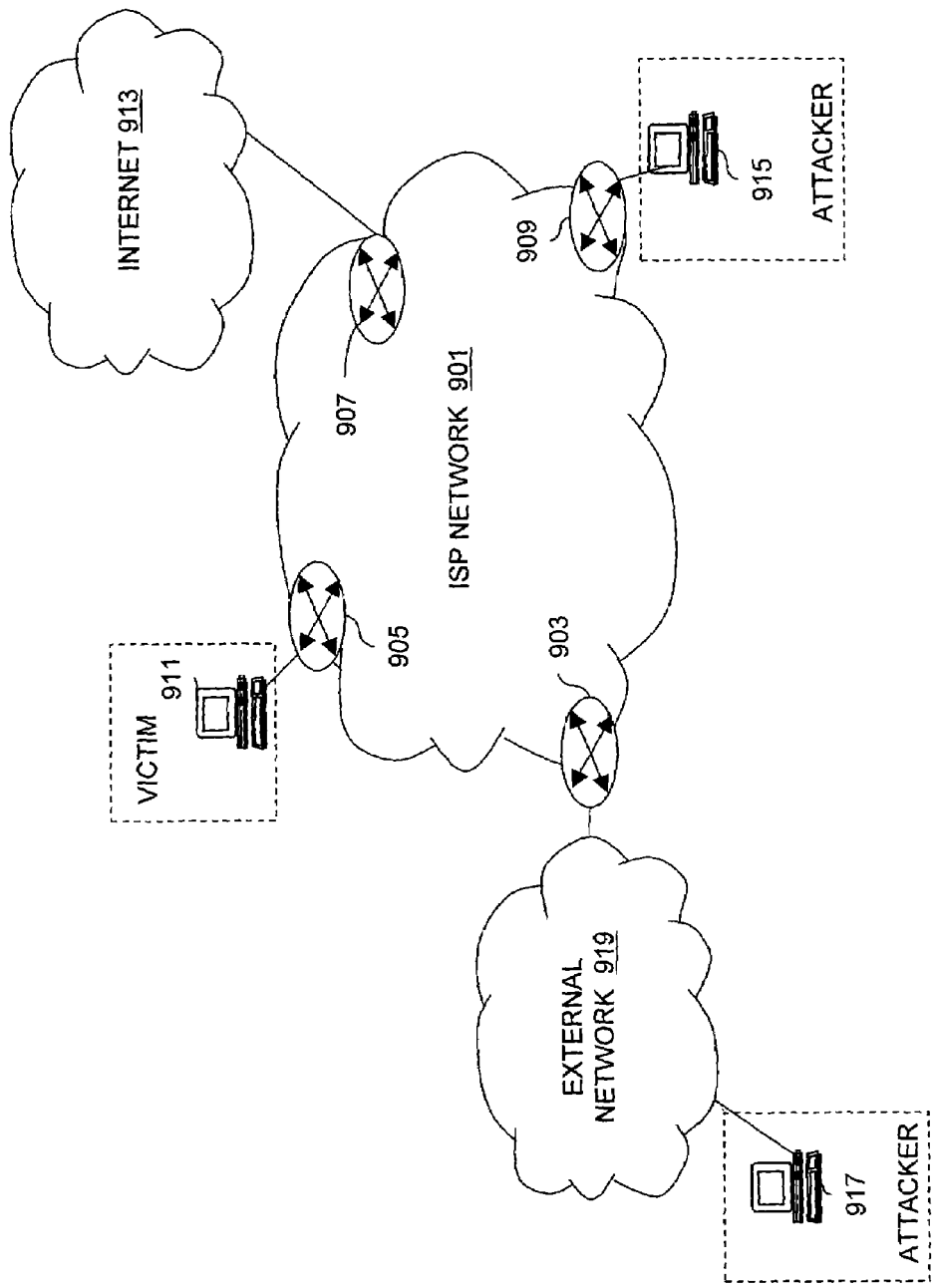
FIG. 9 is a diagram of a conventional approach to addressing denial-of-service (DoS) flood attacks.

FIG. 8 illustrates a computer system 801 that possesses routing capabilities upon which an embodiment according to the present invention may be implemented. Such a computer system 801 may be configured as a node to perform identification of the DoS flood attack datagrams. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Notably, routing tables may be stored in main memory 807. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions.

Embodiments are related to the use of computer system 801 to selectively forward DoS flood attack datagrams. According to one embodiment, rerouting of the DoS flood attack datagrams is provided by computer system 801 in response to processor 805 executing one or more sequences of one or more instructions contained in main memory 807 in conjunction with the routing engine 819. Such instructions may be read into main memory 807 from another computer-readable medium, such as storage device 811. Execution of the sequences of instructions contained in main memory 807 causes processor 805 and routing engine 819 to perform the process steps described herein (as in FIG. 2). One of the responsibilities of processor 805 is to determine whether the received datagrams match a predetermined attack signature. The received datagrams can be stored in buffer unit 813 for processing by processor 805.

One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 805 and the routing engine 819 for transmitting and receiving datagrams to/from the IP network 823. Such a medium may take many forms, 1, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to network parameters/characteristics into its dynamic memory and send the instructions over a packet-switched network or a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes an input/output unit 815 coupled to bus 803. The input/output unit 815 provides a two-way data communication coupling to a network link 821 that is connected to the IP network 823. For example, input/output unit 815 may be a communication interface card to attach to any packet-switched network or telecommunication network using the following exemplary interfaces: SONET (Synchronous Optical Network) (e.g., OC-3c, OC-12c, OC-48c, etc.), ATM (Asynchronous Transfer Mode) (25 Mbps, 622 Mbps, etc.), T3/T1, DSL (Digital Subscriber Line), and ISDN (Integrated Services Digital Network). Wireless links may also be implemented. In any such implementation, input/output unit 815 sends and receives electrical, electromagnetic or optical signals that carry digital data streams representing various types of information. Network link 821 typically provides data communication through one or more networks (i.e., the private network 617) to other data devices. Networks, which are a part of the private network 617, use electrical, electromagnetic or optical signals that carry digital data streams. The signals through the various networks and the signals on network link 821 and through input/output unit 815, which carry the digital data to and from computer system 801, are exemplary forms of carrier waves transporting the information.

Computer system 801 can send messages and receive data, including program code, through the network(s), network link 821 and input/output unit 815. The received code may be executed by processor 805 as it is received, and/or stored in storage device 811, or other non-volatile storage for later execution. In this manner, computer system 801 may obtain application code in the form of a carrier wave.

The techniques described herein provide several advantages over prior approaches to tracking DoS flood attacks. An overlay network of IP tunnels selectively reroutes flood attack datagrams directly from edge routers to the tracking routers. Using security diagnostic features, the edge routers and the tracking routers identify DoS flood attack datagrams and perform input debugging to determine the ingress edge router. These datagrams are examined and dropped or forwarded to the appropriate egress point. This approach simplifies the process of determining the ingress adjacency of a flood attack, using the existing hardware and software infrastructure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for tracking denial-of-service floods, the method comprising:
    rerouting a DoS flood attack datagram to a tracking router, wherein the tracking router forms an overlay tracking network with respect to an egress edge router; and
    identifying, by the tracking router, an ingress edge router that forwarded the DoS flood attack datagram.

2. The method according to claim 1, further comprises executing security diagnostic functions.

3. The method according to claim 2, wherein the security diagnostic functions comprise input debugging.

4. The method according to claim 1, wherein the overlay tracking network is within an autonomous system that is different from another autonomous system corresponding to the ingress edge router and the egress edge router.

5. The method according to claim 4, further comprising providing routing information by the overlay tracking network to the ingress edge router and the egress edge router using an inter-administrative-domain routing/signaling protocol.

6. The method according to claim 5, wherein the inter-administrative-domain routing/signaling protocol is BGP (Border Gateway Protocol).

7. The method according to claim 1, further comprising communicating between the edge routers and the tracking router via tunnels that are created over an unreliable datagram delivery service protocol.

8. The method according to claim 1, further comprising communicating between the edge routers and the tracking router via virtual connections over a separate lower layer protocol.

9. The method according to claim 1, further comprising communicating between the edge routers and the tracking router via physical connections.

10. The method according to claim 1, further comprising routing the DoS flood attack datagram from the ingress edge router to the tracking router, wherein the egress edge router has a static route to the victim.

11. The method according to claim 10, further comprising announcing the static route to the edge routers using an inter-administrative-domain routing/signaling protocol.

12. The method according to claim 11, wherein the inter-administrative-domain routing/signaling protocol in the announcing step is EBGP (External Border Gateway Protocol).

13. The method according to claim 11, further comprising establishing another static route between the egress router and an external router associated with a victim node, the victim node receiving the DoS flood attack datagram.

14. A communication system for tracking denial-of-service (DoS) floods, the communication system comprising:
   a plurality of edge routers including an ingress edge router and an egress edge router, each of the edge routers being configured to perform security diagnostic functions, in part, to identify a DoS flood attack datagram, wherein the ingress edge router is associated with a source of the DoS flood attack datagram; and
   a tracking router adjacent to the egress edge router, the tracking router being configured to perform the security diagnostic functions, the ingress edge router rerouting the DoS flood attack datagram to the tracking router as to permit identification of the ingress edge router, wherein the tracking router forms an overlay tracking network with respect to the plurality of edge routers.

15. The system according to claim 14, wherein the security diagnostic functions comprise input debugging.

16. The system according to claim 14, wherein the overlay tracking network is within an autonomous system that is different from another autonomous system corresponding to the plurality of edge routers.

17. The system according to claim 16, wherein the tracking router communicates routing information by the overlay network to the one edge router using an inter-administrative-domain routing/signaling protocol.

18. The system according to claim 17, wherein the inter-administrative-domain routing/signaling protocol is BGP.

19. The system according to claim 14, wherein the tracking router communicates with the edge routers via tunnels that are created over an unreliable datagram delivery service protocol.

20. The system according to claim 14, wherein the tracking router communicates with the edge routers via virtual connections over a separate lower layer protocol.

21. The system according to claim 14, wherein the tracking router communicates with the edge routers via physical connections.

22. The system according to claim 14, wherein the overlay tracking network further comprises additional tracking routers.

23. The system according to claim 22, wherein the tracking routers are interconnected via tunnels that are created over an unreliable datagram delivery service protocol.

24. The system according to claim 22, wherein the tracking routers are interconnected via virtual connections over a separate lower layer protocol.

25. The system according to claim 22, wherein the tracking routers are interconnected via physical connections.

26. The system according to claim 14, wherein the ingress edge router routes the DoS flood attack datagram to the tracking router due to a dynamic routing update from the tracking router.

27. The system according to claim 26, further comprising an external router coupled to the egress edge router via another static route, wherein the external router is associated with a victim node, the victim node receiving the DoS flood attack datagram.

28. A computer-readable medium carrying one or more sequences of one or more instructions for tracking denial-of-service floods (DoS), the one or more sequences of one or more instructions including instructions which, when executed by one or more processors, cause the one or more processors to perform the steps of:
   receiving a DoS flood attack datagram on an overlay network formed by a tracking router;
   identifying the DoS flood attack datagram; and
   identifying, by the tracking router, a previous hop router associated with the DoS flood attack datagram to determine an ingress adjacency associated with the DoS flood attack.

29. The computer-readable medium according to claim 28, wherein the computer readable medium further includes instructions for causing the one or more processors to perform the steps of:
   instructing the previous hop router to identify a respective previous hop router associated with the DoS flood attack datagram.

* * * * *